United States Patent
Miyauchi et al.

(10) Patent No.: US 9,172,436 B2
(45) Date of Patent: Oct. 27, 2015

(54) WIRELESS POWER TRANSFER DEVICE AND WIRELESS POWER TRANSFER METHOD

(75) Inventors: Yasushi Miyauchi, Kyoto (JP); Satoru Onuki, Kyoto (JP)

(73) Assignee: HITACHI MAXELL, LTD., Ibaraki-shi, Osaka (JP)

( * ) Notice: Subject to any disclaimer, the term of this patent is extended or adjusted under 35 U.S.C. 154(b) by 839 days.

(21) Appl. No.: 13/413,829

(22) Filed: Mar. 7, 2012

(65) Prior Publication Data

US 2013/0082535 A1    Apr. 4, 2013

(30) Foreign Application Priority Data

Sep. 29, 2011  (JP) ................................. 2011-214563
Dec. 26, 2011  (JP) ................................. 2011-283803

(51) Int. Cl.
*H02J 17/00* (2006.01)
*H04B 5/00* (2006.01)
*B60L 11/18* (2006.01)

(52) U.S. Cl.
CPC ............ *H04B 5/0037* (2013.01); *B60L 11/182* (2013.01); *H04B 5/0093* (2013.01); *Y02T 10/7005* (2013.01); *Y02T 90/122* (2013.01); *Y02T 90/14* (2013.01)

(58) Field of Classification Search
USPC ........................................................ 307/104
See application file for complete search history.

(56) References Cited

U.S. PATENT DOCUMENTS

| 2005/0156560 | A1  |  7/2005 | Shimaoka et al. |
|---|---|---|---|
| 2009/0015381 | A1* | 1/2009 | Mochida et al. ............. 340/10.2 |
| 2009/0079268 | A1* | 3/2009 | Cook et al. .................... 307/104 |
| 2009/0246090 | A1* | 10/2009 | Burke et al. ................... 422/119 |

(Continued)

FOREIGN PATENT DOCUMENTS

| JP | 2000-270501 A | 9/2000 |
|---|---|---|
| JP | 2004-7851 A | 1/2004 |

(Continued)

OTHER PUBLICATIONS

Extended European Search Report for European Application No. 12001521.9, dated Jun. 22, 2012.

(Continued)

*Primary Examiner* — Jared Fureman
*Assistant Examiner* — Joel Barnett
(74) *Attorney, Agent, or Firm* — Birch, Stewart, Kolasch & Birch, LLP

(57) ABSTRACT

A wireless power transfer device including: a power transmitter 1 including a power transmission resonator composed of a power transmission coil and a resonant capacitance; and a power receiver including a power receiving resonator composed of a power receiving coil and a resonant capacitance. The wireless power transfer device further includes a power-transmission auxiliary device including an auxiliary resonator composed of an auxiliary coil and a resonant capacitance. The power-transmission auxiliary device and the power transmitter are configured to be disposed so as to face each other, forming a power receiving space for disposing the power receiving coil between the power transmission coil and the auxiliary coil. An efficient power transfer can be performed without providing an adjusting circuit in the power receiver even when the power receiving coil is not appropriately disposed with respect to the power transmission coil.

14 Claims, 16 Drawing Sheets

(56) References Cited

U.S. PATENT DOCUMENTS

| | | | |
|---|---|---|---|
| 2010/0164296 A1 | 7/2010 | Kurs et al. | |
| 2010/0201201 A1* | 8/2010 | Mobarhan et al. | 307/104 |
| 2010/0201311 A1* | 8/2010 | Lyell et al. | 320/108 |
| 2011/0133569 A1 | 6/2011 | Cheon et al. | |
| 2011/0169338 A1 | 7/2011 | Kozakai | |
| 2011/0309792 A1 | 12/2011 | Mochida et al. | |
| 2012/0194000 A1 | 8/2012 | Uchida | |

FOREIGN PATENT DOCUMENTS

| | | |
|---|---|---|
| JP | 2010-207017 A | 9/2010 |
| JP | 2011-147271 A | 7/2011 |
| WO | WO 2011/064879 A1 | 6/2011 |

OTHER PUBLICATIONS

Lozano-Nieto, "RFID Design Fundamentals and Applications," CRC Press, 2011, pp. 1-6, 29-33, 86-97, and 103-104, XP002677043.

Texas Instruments, "HF Antenna Design Notes Technical Application Report," Radio Frequency Identification Systems, Sep. 2003, 46 pages, XP002677042.

Haus, "Coupling of Modes—Resonators and Couplers," Waves and Fields in Optoelectronics, Prentice-Hall Series in Solid State Physical Electronics, Jan. 1, 1984, pp. 197-234.

The Office Action, dated Nov. 8, 2013, issued in the corresponding European Patent Application No. 12001521.9.

An Office Action issued in the corresponding Japanese Patent Application No. 2011-283803 on Jul. 21, 2015.

* cited by examiner

WIRELESS POWER TRANSFER DEVICE AND WIRELESS POWER TRANSFER METHOD

BACKGROUND OF THE INVENTION

1. Field of the Invention

The present invention relates to a wireless power transfer device and a wireless power transfer method of wireless power transfer via a power transmission coil provided in a power transmitter and a power receiving coil provided in a power receiver.

2. Description of Related Art

As methods of wireless power transfer, an electromagnetic induction type (several hundred kHz), electric or magnetic-field resonance type using transfer based on LC resonance through electric or magnetic field resonance, a microwave transmission-type using radio waves (several GHz), and a laser transmission-type using electromagnetic waves (light) in the visible radiation range are known. Among them, the electromagnetic induction type has already been used practically. Although this method is advantageous, for example, in that it can be realized with simple circuitry (a transformer), it also has the problem of a short power transmission distance.

Therefore, the electric or magnetic field resonance-type power transfer methods recently has been attracting attention, because of a ability of a short-distance transfer (up to 2 m). Among them, in the electric field resonance type method, when placing the hand or the like in a transfer path, a dielectric loss is caused, because the human body, which is a dielectric, absorbs energy as heat. In contrast, in the magnetic field resonance type method, the human body hardly absorbs energy and a dielectric loss thus can be avoided. From this viewpoint, the magnetic field resonance type method attracts an increasing attention.

FIG. 17 is a front view schematically showing an example of the configuration of a conventional power transfer device using magnetic field resonance. A power transmitter 1 includes a power transmission coil unit including a combination of a loop coil 3a and a power transmission coil 4a (operating as a resonance coil for transmitting power). A power receiver 2 includes a power receiving coil unit including a combination of a loop coil 3b and a power receiving coil 4b (operating as a resonance coil for receiving power). To the loop coil 3a of the power transmitter 1 is connected a high-frequency power driver 5, which converts the power of an AC power supply (AC 100 V) 6 into a high-frequency power capable of being transmitted. As a load to the loop coil 3b of the power receiver 2, for example, a rechargeable battery 8 is connected via a rectifier 7.

The loop coil 3a is a dielectric element that is excited by an electric signal supplied from the high-frequency power driver 5 and transfers the electric signal to the power transmission coil 4a by electromagnetic induction. The power transmission coil 4a generates a magnetic field based on the electric signal that has been output from the loop coil 3a. The magnetic field strength of the power transmission coil 4a is a maximum when the resonant frequency $f0=1/\{2\pi(LC)^{1/2}\}$ (L represents the inductance of the power transmission coil 4a on the power transmission side, and C represents the stray capacitance). The power supplied to the power transmission coil 4a is wirelessly transferred to the power receiving coil 4b by magnetic field resonance. The transferred power is transferred from the power receiving coil 4b to the loop coil 3b by electromagnetic induction, rectified by the rectifier 7, and supplied to the rechargeable battery 8. In this case, the resonance frequencies of the power transmission coil 4a and the power receiving coil 4b are set to be the same.

In the condition of wirelessly transmitting and receiving power by the electromagnetic induction-type method or the magnetic field resonance-type method, if the power receiving coil unit is not appropriately disposed with respect to the power transmission coil unit, it is difficult to transfer power efficiently. Particularly, when a secondary battery that is charged by the power receiver 2 is mounted to portable equipment, a shielding member (including a wave absorber) for minimizing the influence of electromagnetic waves may be inserted between the power receiving coil unit and the secondary battery pack. In such a case, when the portable power receiving coil unit is placed upside down, the shielding member is interposed between the power transmission coil unit and the power receiving coil unit, which results in a significant reduction in the transfer efficiency and makes power transfer difficult.

Therefore, JP 2010-207017A discloses a charging system including a front/back discrimination unit (using a magnetic sensor) that detects whether the surface suitable for power reception of a power receiving coil unit faces properly a power transmission coil unit that supplies power, so that if the surface does not properly face the power transmission coil unit, the user is warned.

In the art disclosed in JP 2010-207017A, if the surface suitable for power reception of a power receiver does not properly face a power transmitter that supplies power, the user is merely warned by means of a sound or the like and eventually has to bring the surface back to the proper posture, making the operation troublesome. Moreover, in the art disclosed in JP 2010-207017A, a magnetic sensor is provided on the power receiver side for the front/back discrimination, and therefore, it is difficult to provide such function other than the charging function in the power receiver if the power receiver is small (e.g., an in-the-ear hearing aid).

If the size of the power receiving coil unit is small relative to that of the power transmission coil unit, a reduction in the power transfer efficiency, a reduction in the possible power transfer distance, and the like may occur. Furthermore, also when the coupling coefficient or the like has changed due to a change in the state such as a change in the distance between the power transmission coil unit and the power receiving coil unit, it is desired to provide an adjusting circuit in the power receiver in order to match the resonance frequencies. However, as described above, it is difficult to provide any additional function in the power receiver other than the charging function.

SUMMARY OF THE INVENTION

In order to solve the foregoing problems of the conventional art, it is an object of the present invention to provide a wireless power transfer device and a wireless power transfer method that enable efficient power transfer without providing an adjusting circuit in a power receiver even when a power receiving coil unit is not appropriately disposed with respect to a power transmission coil unit, for example, when the surface suitable for power reception of the power receiver does not properly face the power transmitter.

It is another object of the present invention to provide a wireless power transfer device and a wireless power transfer method that can suppress the reduction in the power transfer efficiency, the reduction in the possible power transfer distance, and the like even when the size of the power receiving coil unit is small relative to that of the power transmission coil unit.

A wireless power transfer device of the present invention is configured to include: a power transmitter including a power transmission resonator composed of a power transmission coil and a resonant capacitance; and a power receiver including a power receiving resonator composed of a power receiving coil and a resonant capacitance, thereby transferring power from the power transmitter to the power receiver through an interaction between the power transmission coil and the power receiving coil.

In order to solve the foregoing problems, the wireless power transfer device of the present invention further includes: a power-transmission auxiliary device including an auxiliary resonator composed of an auxiliary coil and a resonant capacitance, wherein the power-transmission auxiliary device and the power transmitter are configured to be disposed so as to face each other, forming a power receiving space for disposing the power receiving coil between the power transmission coil and the auxiliary coil.

A wireless power transfer method of the present invention uses: a power transmitter including a power transmission resonator composed of a power transmission coil and a resonant capacitance, and a power receiver including a power receiving resonator composed of a power receiving coil and a resonant capacitance, thereby transferring an electric power from the power transmitter to the power receiver through an interaction between the power transmission coil and the power receiving coil. The method further uses a power-transmission auxiliary device including an auxiliary resonator composed of an auxiliary coil and a resonant capacitance, and the method includes: disposing the power-transmission auxiliary device and the power transmitter so as to face each other, forming a power receiving space between the power transmission coil and the auxiliary coil, and performing a power transfer with the power receiving coil being disposed in the power receiving space.

According to the present invention, due to the configuration in which the power receiving coil is disposed in the power receiving space formed between the power transmission coil and the auxiliary coil, a distance dependency of the power transfer efficiency on the distance between the power transmitter and the power receiver can be made flat over a long range without the need to provide the power receiver with means for adjusting the resonant frequency, making it possible to increase the possible power transfer distance.

Therefore, it is possible to perform efficient power transfer even in the case where the power receiving coil is not appropriately disposed with respect to the power transmission coil, for example, where the surface suitable for power reception of the power receiver does not properly face the power transmitter. It is also possible to suppress the reduction in the power transfer efficiency, the reduction in the possible power transfer distance, and the like even when the size of the power receiving coil is small relative to that of the power transmission coil.

DETAILED DESCRIPTION OF THE INVENTION

Figure 1:
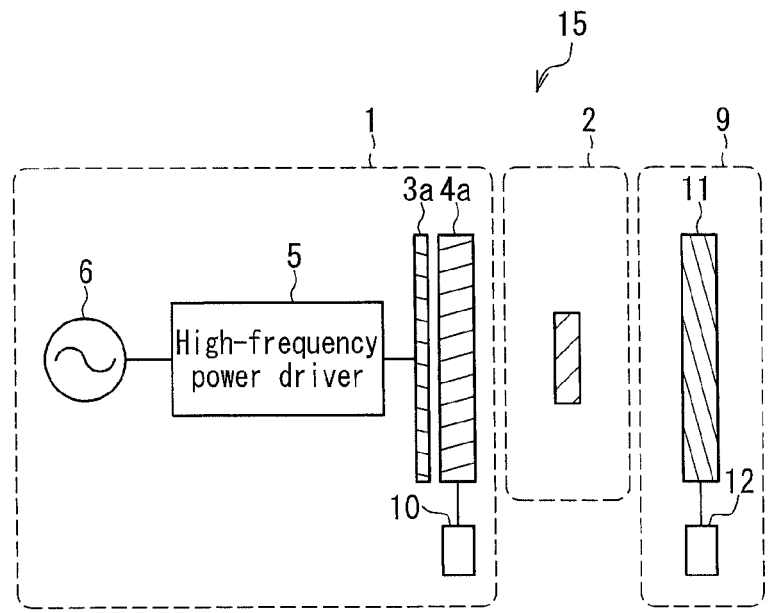
FIG. 1 is a cross-sectional view schematically showing the configuration of a wireless power transfer device according to Embodiment 1.

Based on the above-described configuration, the present invention may be modified as follows.

That is, the wireless power transfer device having the above-described configuration may be configured so that an electric power is transferred from the power transmitter to the power receiver through magnetic field resonance between the power transmission coil and the power receiving coil.

Preferably, a resonant frequency f3 of the auxiliary resonator is set such that a resonant frequency ft of a power transmission-side resonant system composed of the power transmission resonator and the auxiliary resonator coincides with a resonant frequency f2 of the power receiving resonator.

It is possible to adopt a configuration in which an adjusting variable capacitor is provided as the resonant capacitance of the power-transmission auxiliary device, and a resonant frequency f3 of the auxiliary resonator is set by adjusting the adjusting variable capacitor.

Preferably, a diameter d1 of the power transmission coil, a diameter d2 of the power receiving coil, and a diameter d3 of the auxiliary coil satisfy the relationship: d1>d2, and d2<d3. If this relationship is maintained, it is possible to achieve effects such as an increased possible power transfer distance. It is particularly preferable that the relationship: d1=d3, and d1>d2 is satisfied. This can provide a significant effect for the improvement in transmission efficiency characteristics (e.g., an increased possible power receiving range). The invention is not limited to circular coils, and the same effects also can, of course, be achieved with a configuration in which square coils or the like are disposed.

Preferably, a central axis of the power transmission coil, a central axis of the auxiliary coil, and a central axis of the power receiving coil are arranged to be coaxial.

It is possible to adopt a configuration in which a resonant frequency f1 of the power transmission resonator, a resonant frequency f2 of the power receiving resonator, and a resonant frequency f3 of the auxiliary resonator are set so as to satisfy the relationship: f1=f2<f3, or f3<f1=f2.

It is possible to adopt a configuration in which a resonant frequency f1 of the power transmission resonator, a resonant frequency f2 of the power receiving resonator, and a resonant frequency f3 of the auxiliary resonator are set so as to satisfy the relationship: f2<f1=f3, or f1=f3<f2.

It is possible to adopt a configuration further including a casing that holds the power transmitter and the power-transmission auxiliary device and is configured to be capable of setting a positional relationship between the power transmitter and the power-transmission auxiliary device so as to form the power receiving space, wherein the power receiver can be removably placed in the power receiving space, the casing is provided with a lid that can be opened and closed, and power transfer from the power transmission coil to the power receiving coil is performed with the lid being closed, and an area surrounding the power transmission coil, the auxiliary coil, and the power receiving coil is electromagnetically shielded during power transfer from the power transmission coil to the power receiving coil.

In this configuration, the casing may be provided with an interlock function for maintaining a state of power transfer from the power transmitter to the power receiver, and the interlock function maintains a condition of electromagnetically shielding an area surrounding the power transmission coil, the auxiliary coil, and the power receiving coil during power transfer.

In the wireless power transfer method having the above-described configuration, a variable capacitance may be used as the resonant capacitance composing the auxiliary resonator, and power transfer efficiency is adjusted by adjusting the variable capacitance while disposing the power receiving coil in the power receiving space.

Hereinafter, embodiments of the present invention will be described with reference to the accompanying drawings.

Embodiment 1

Figure 17:
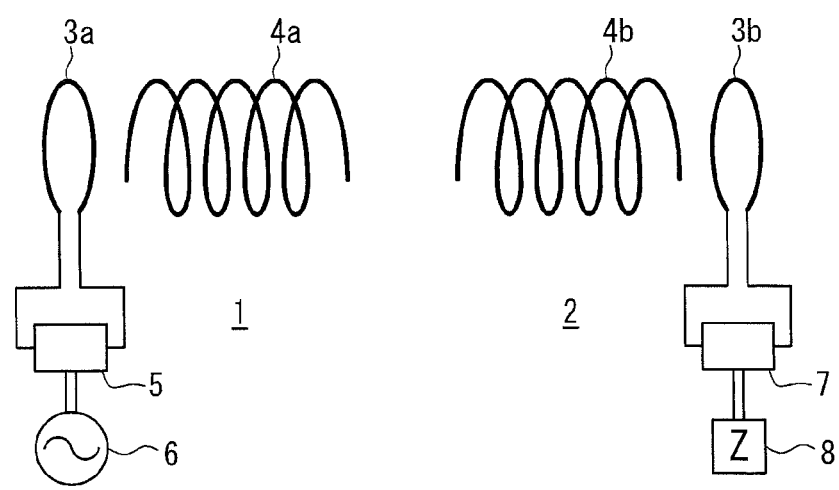
FIG. 17 is a cross-sectional view showing a configuration of a conventional wireless power transfer device.

FIG. 1 is a cross-sectional view showing schematically the configuration of a wireless power transfer device of a magnetic field resonance type according to Embodiment 1. Note that the same elements as those of the conventional wireless power transfer device shown in FIG. 17 are denoted by the same reference numerals, and the description thereof will not be repeated.

This wireless power transfer device includes a power-transmission auxiliary device 9 in addition to the power transmitter 1 and the power receiver 2 of conventional technology, and is configured to perform wireless power transfer in a state in which the power receiver 2 is disposed in a space between the power transmitter 1 and the power-transmission auxiliary device 9. The power transmitter 1 converts power of an AC power supply (AC 100 V) into high-frequency power capable of being transmitted, and transfer the power, and the power receiver 2 receives the power. The power-transmission auxiliary device 9 has the function of setting the resonant frequency of the resonant system relevant to the power transmitter 1 during power transfer into an appropriate relationship with the resonant frequency of the resonant system of the power receiver 2.

The power transmitter 1 includes a power transmission coil unit formed by a combination of a loop coil 3a for transmitting power and a power transmission coil 4a, and a high-frequency power driver 5 that converts the power of the AC power supply (AC 100 V) 6 into high-frequency power capable of being transmitted. The loop coil 3a for transmitting power is not necessarily provided. Note that the present invention is not limited to power transfer devices using magnetic field resonance, and is also applicable to power transfer devices using electromagnetic induction or the like. Therefore, the power transmission coil 4a and a power receiving coil 4b described below should be adapted to the system of power transfer.

A resonant capacitance 10 is connected to the power transmission coil 4a, thereby forming a power transmission resonator. As the resonant capacitance 10, a variable capacitor or fixed capacitor serving as a circuit element may be connected, or it is possible to adopt a configuration in which a stray capacitance is used. Accordingly, the resonant capacitance 10 will not be illustrated in the subsequent drawings. Note that in the following description, the resonant frequency f1 of the power transmission resonator alone is referred to as "the resonant frequency f1 of the power transmitter 1" in order to facilitate understanding of the relationship with the illustration in the drawings.

The power-transmission auxiliary device 9 includes an auxiliary coil 11 and an adjusting capacitor 12 serving as the resonant capacitance, and the two elements form an auxiliary resonator. Note that in the following description, the resonant frequency f3 of the auxiliary resonator alone is referred to as "the resonant frequency f3 of the power-transmission auxiliary device 9" in order to facilitate understanding of the relationship with the illustrations. As the adjusting capacitor 12, a fixed capacitor with a capacitance value appropriately set as will be described below may be used, or a variable capacitor may be used so that the capacitance value can be always readjustable.

Although not shown, the device may include, as needed, means for monitoring, for example, the reflected power, the resonant frequency, the flowing current, or the voltage of the power transmission coil 4a, and a circuit or the like for allowing the power transmitter 1, the power receiver 2, and the power-transmission auxiliary device 9 to exchange information with each other. In the case of adopting such a configuration, it is possible to use a variable capacitor as the adjusting capacitor 12 and automatically control the capacitance value.

Figure 2:
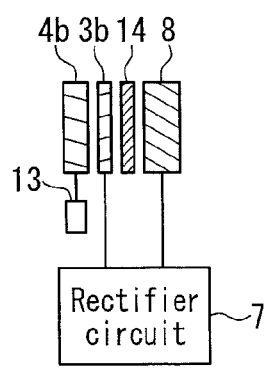
FIG. 2 is a cross-sectional view schematically showing the configuration of a power receiver of the wireless power transfer device according to Embodiment 1.

As shown in FIG. 2, the power receiver 2 is provided with a power receiving coil unit formed by a combination of the power receiving coil 4b and the loop coil 3b. The power obtained with the loop coil 3b is stored in the rechargeable battery 8 at least via a rectifier circuit 7. A resonant capacitance 13 is connected to the power receiving coil 4b, thereby forming a power receiving resonator. As the resonant capacitance 13, a variable capacitor or fixed capacitor serving as a circuit element may be connected, or it is possible to adopt a configuration in which a stray capacitance is used. Accordingly, the resonant capacitance 13 will not be illustrated in the subsequent drawings. Note that in the following description, the resonant frequency f2 of the power receiving resonator alone is referred to as "the resonant frequency f2 of the power receiver 2" in order to facilitate understanding of the relationship with the illustration in the drawings.

In the case of using a small battery (e.g., a coin battery) as the rechargeable battery 8, it is preferable to reduce the installation area by overlapping the loop coil 3b and the rechargeable battery 8 with each other (e.g., a coil-on battery). In this case, a magnetic flux may be leaked from the loop coil 3b to the rechargeable battery 8 and generates an eddy current, which results in a loss (eddy-current loss). Therefore, it is desirable that a wave absorber 14 having a high magnetic permeability at the resonant frequency for the power transfer is disposed between the loop coil 3b and the rechargeable battery 8. In this case, the loop coil 3b and the rechargeable battery 8 may be brought into close contact with each other with the wave absorber 14 sandwiched therebetween, in order to reduce the total thickness.

As shown in FIG. 1, the power-transmission auxiliary device 9 and the power transmitter 1 so as to face each other, with a power receiving space 15 being formed between the power transmission coil 4a and the auxiliary coil 11, and the power receiver 2 including the power receiving coil 4b is to be disposed in the power receiving space 15.

In this embodiment, the loop coil 3a and the power transmission coil 4a of the power transmitter 1 have the same function as that of their counterparts shown in FIG. 17. However, these coils are formed of a planar coil obtained by spirally winding a Cu coil (with coating) having a diameter of about 1 mm on the same plane in order to realize a reduced thickness. Furthermore, the loop coil 3b and the power receiving coil 4b of the power receiver 2 have the same function as that of their counterparts shown in FIG. 17, but they are formed of a thin-film coil obtained by forming, in a spiral form, a Cu foil having a thickness of about 70 μm on the same plane on a thin printed-circuit board having a thickness of 0.4 mm, in order to realize a reduced size. Furthermore, in order to reduce the thickness of the substrate, the loop coil 3b for power reception and the power receiving coil 4b may be formed separately on both sides of the substrate.

The function of the power-transmission auxiliary device 9 constituting the feature of the wireless power transfer device of this embodiment will now be described in further detail. With the above-described configuration, coupling between the power transmission coil 4a and the auxiliary coil 11 forms a resonant system composed of a power transmission resonator including the power transmission coil 4a and an auxiliary resonator including the auxiliary coil 11. In the following description, this resonant system is referred to as the "power transmission-side resonant system". Further, the resonant frequency of the power transmission-side resonant system is referred to as "ft".

With the configuration of the wireless power transfer device according to this embodiment shown in FIG. 1, it is possible to achieve effects such as an increased possible power transfer distance and so on as will be described below, compared to a configuration that is not provided with the power-transmission auxiliary device 9. The reason for this seems to be that the reaching distance of the magnetic flux from the power transmission coil 4a is increased by disposing the auxiliary coil 11 so as to face the power transmission coil 4a. This enables efficient power transfer without providing an adjusting circuit in the power receiver 2 even when the power receiving coil 4b is not disposed appropriately with respect to the power transmission coil 4a, for example, where the surface suitable for power reception of the power receiver 2 does not properly face the power transmitter 1.

On the other hand, in the configuration as shown in FIG. 1, the resonant frequency of the power transmitter 1 is different from the initially set resonant frequency f1 of the power transmission resonator alone, under a magnetic influence of the auxiliary coil 11. However, the resonant frequency ft of the power transmission-side resonant system can be made to coincide with the resonant frequency f2 of the power receiver 2 by appropriately setting the resonant frequency f3 of the power-transmission auxiliary device 9 by adjusting the capacitance value C of the adjusting capacitor 12 that is connected to the auxiliary coil 11. This enables the power transfer efficiency of transferring an electric power from the power transmission coil 4a to be maintained at a practically sufficient level, thus achieving effects such as an increased possible power transfer distance and so on.

Although it is desirable that the capacitance value C of the adjusting capacitor 12 is set such that the resonant frequency ft coincides with the resonant frequency f2, an appropriate effect can be achieved even if the two frequencies do not coincide completely with each other. That is, it is appropriate that the resonant frequency f3 of the power-transmission auxiliary device 9 is set such that the peak of the resonant frequency ft of the power transmission-side resonant system is brought closer to the resonant frequency f2 of the power receiver 2, compared to the resonant frequency f1 of the power transmitter 1. To obtain sufficiently an effect achieved by such adjustment, it is desirable that the diameter of the auxiliary coil 11 constituting the power-transmission auxiliary device 9 is substantially the same as the diameter of the power transmission coil 4a, and that the central axes of the two coils are disposed substantially coaxially.

However, an effect such as an increased possible power transfer distance can be achieved appropriately if the relationship d1>d2, and d2<d3 is satisfied where d1 is the diameter of the power transmission coil 4a, d2 is the diameter of the power receiving coil 4b, and d3 is the diameter of the auxiliary coil 11. The reason for this is that if the diameter d1 of the power transmission coil 4a is greater than the diameter d2 of the power receiving coil 4b, the magnetic flux between the power receiving coil 4b and the auxiliary coil 11 can be utilized, and if the diameter d3 of the auxiliary coil 11 is greater than the diameter d2 of the power receiving coil 4b, the magnetic flux between the power receiving coil 4b and the power transmission coil 4a can be utilized.

Here, in order to examine the influence of the auxiliary coil 11, a description will now be given of results of performing a VNA (vector network analyzer) measurement using micro power. The resonant frequency f1 of the power transmitter 1 and the resonant frequency f2 of the power receiver 2 are set by the capacitance values of respective fixed capacitors provided as the resonant capacitances. Specifically, they are set such that f1=f2=12.1 MHz.

Figure 3A:
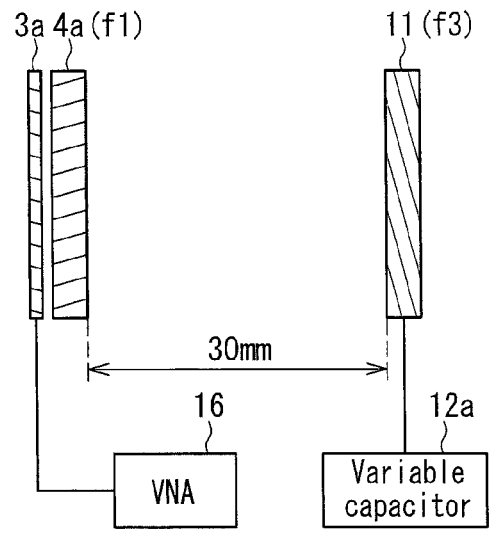
FIG. 3A is a cross-sectional view schematically showing an arrangement of elements of a power transmission-side resonant system of the wireless power transfer device according to Embodiment 1 during a VNA measurement.

First, results of examining the change in the resonant frequency of the power transmission-side resonant system when the resonant frequency f3 of the power-transmission auxiliary device 9 was changed are shown. FIG. 3A shows an example of the arrangement of the coils. More specifically, the power transmission coil 4a and the auxiliary coil 11 are disposed so as to face each other, thereby forming a power receiving space having a length of 30 mm, and a VNA 16 is connected to the loop coil 3a. An adjusting variable capacitor 12a serving as the adjusting capacitor 12 is connected to the auxiliary coil 11, and the resonant frequency f3 was set to be variable.

Figure 3B:
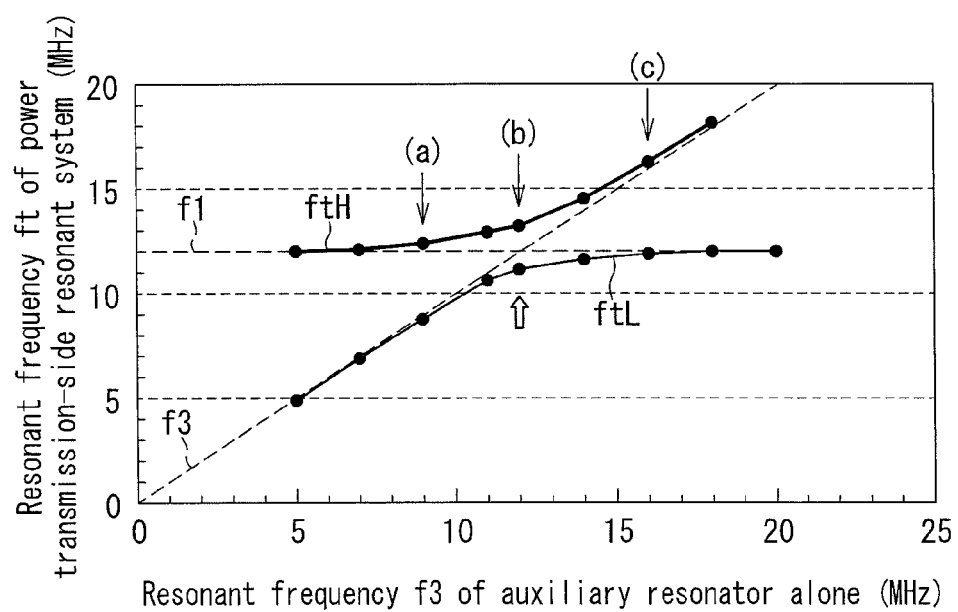
FIG. 3B is a graph showing a frequency dependency of the resonant frequency of the power transmission-side resonant system, measured in the arrangement shown in FIG. 3A, on a resonant frequency f3 of an auxiliary resonator.
Figure 3C:
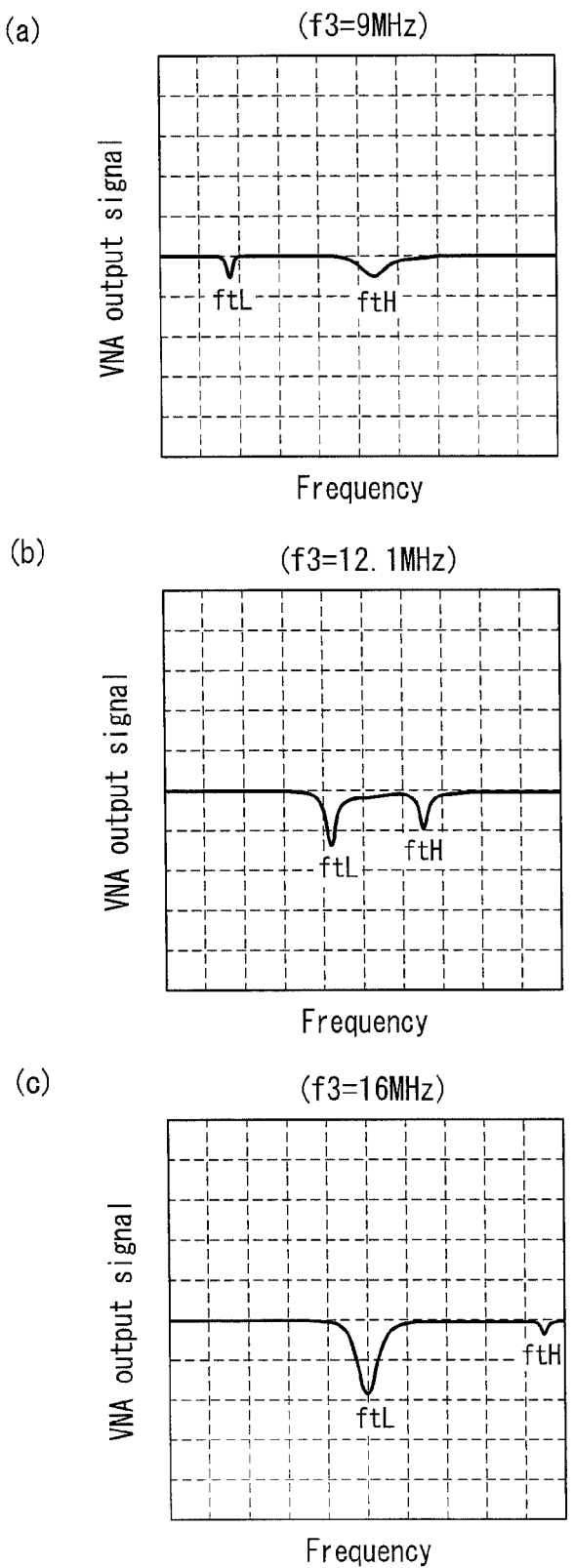
FIG. 3C is an output waveform chart of the VNA measurement for three values of the resonant frequency f3 of the auxiliary resonator, performed in the arrangement shown in FIG. 3A.

FIG. 3B shows the results of the VNA measurement in this arrangement. In FIG. 3B, the horizontal axis represents the value of the resonant frequency f3 of the power-transmission auxiliary device 9, and the vertical axis represents the value of resonant frequency ft of the power transmission-side resonant system during the VNA measurement. FIG. 3C shows an output waveform chart for the VNA measurement in the cases where the resonant frequency f3 is 9 MHz, 12.1 MHz, and 16 MHz, respectively.

For example, when f3 is adjusted to the same resonant frequency as f1 (12.1 MHz), two resonant frequencies centered about 12.1 MHz appear (close coupling) as shown in the waveform chart of FIG. 3C (b). The lower resonant frequency on the left is referred to as "ftL", and the higher resonant frequency on the right is referred to as "ftH". In FIG. 3B, a characteristic line corresponding to the lower resonant frequency ftL and a characteristic line corresponding to the higher resonant frequency ftH are illustrated.

As the resonant frequency f3 of the power-transmission auxiliary device 9 is changed from 9 MHz to 20 MHz, the lower resonant frequency ftL gradually shifts to the higher frequency side, eventually is brought close to 12.1 MHz, which is equal to f1 and f2, and the signal increases as shown in (c) in FIG. 3C. Although the higher resonant frequency ftH also shifts to the higher frequency side, the difference from the lower resonant frequency ftL increases and the signal decreases and approaches zero.

On the other hand, as the resonant frequency f3 is changed to the lower frequency side, the higher resonant frequency ftH gradually shifts to the lower frequency side, and eventually is brought close to 12.1 MHz, which is equal to f1. However, as shown in FIG. 3C (a), the signal does not significantly increase, as compared with the lower resonant frequency ftL. The lower resonant frequency ftL also gradually shifts to the lower frequency side, the difference from the higher resonant frequency ftH increases, and the signal decreases and approaches zero.

Figure 4A:
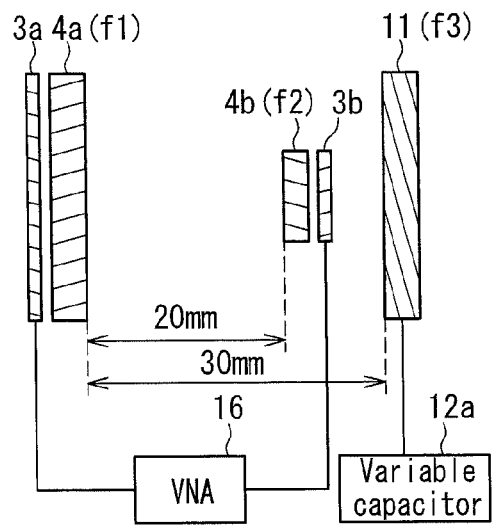
FIG. 4A is a cross-sectional view schematically showing an arrangement of the elements of the wireless power transfer device according to Embodiment 1 during the VNA measurement.

Next, a description will be given of results of examining the change in the power transfer efficiency when the coils were disposed as shown in FIG. 4A and the resonant frequency f3 of the power-transmission auxiliary device 9 was changed. The arrangement in FIG. 4A is configured by disposing the power receiving coil 4b and the loop coil 3b in the power receiving space between the power transmission coil 4a and the auxiliary coil 11 in the arrangement of FIG. 3A. The VNA 16 was connected to the loop coils 3a and 3b. Note that the power transfer efficiency as used herein refers to a value of power transfer efficiency between the power transmission coil 4a and the power receiving coil 4b, and does not include the efficiency of the circuit and the like.

Figure 4B:
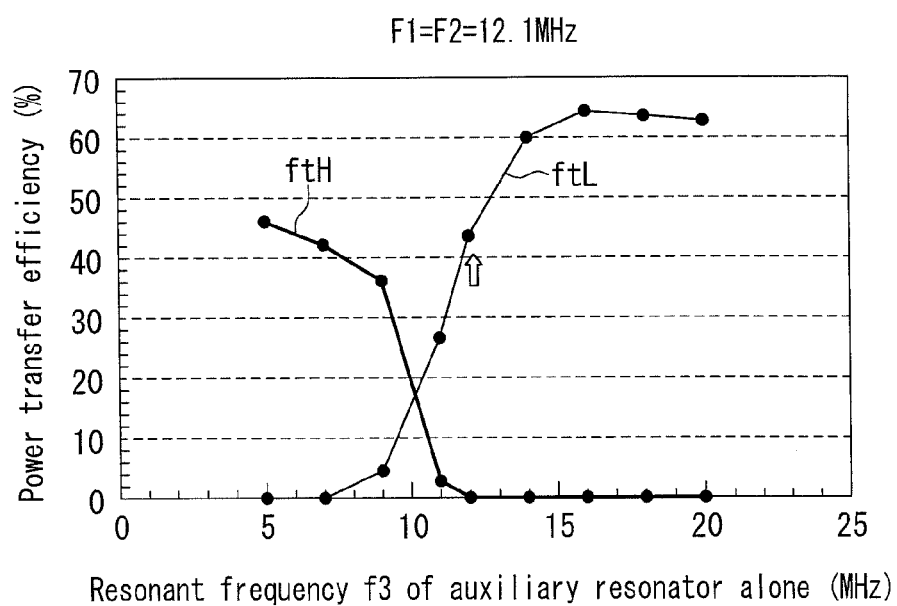
FIG. 4B is a graph showing a frequency dependency of the power transfer efficiency on the resonant frequency f3, measured in the arrangement shown in FIG. 4A.

FIG. 4B shows results of the VNA measurement in this arrangement. In FIG. 4B as well, a characteristic line corresponding to the lower resonant frequency ftL and a characteristic line corresponding to the higher resonant frequency ftH are illustrated. As can be seen from FIG. 4B, for example, when f1=f2=f3=12.1 MHz (indicated by the arrow), the power transfer efficiency is as small as about 44%. As f3 is increased further, the power transfer efficiency corresponding to the lower resonant frequency ftL increases. When f3=16 MHz, a power transfer efficiency of about 64% can be obtained.

As described above, increasing the resonant frequency f3 of the power-transmission auxiliary device 9 to be greater than f1 and f2 causes the resonant frequency ft for power transfer to be brought closer to the resonant frequency f2, thereby increasing the power transfer efficiency at that time.

On the other hand, as the resonant frequency f3 is changed to the low frequency side, the power transfer efficiency corresponding to the higher resonant frequency ftH increases. When f3=5 MHz, a power transfer efficiency of about 46% can be obtained. However, the value in the maximum region of the power transfer efficiency corresponding to the higher resonant frequency ftH is smaller than the value in the maximum region of the power transfer efficiency corresponding to the lower resonant frequency ftL.

Figure 5:
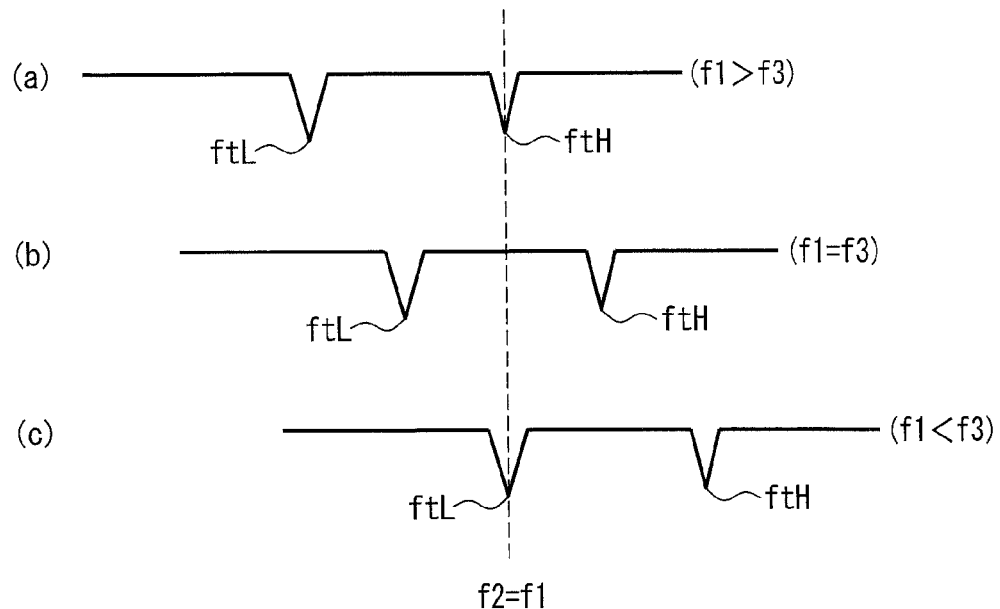
FIG. 5 shows the relationship of resonance frequencies ftL and ftH of the power transmission-side resonant system with respect to a setting example of the relationship between respective resonance frequencies f1, f2, and f3 of the power transmission resonator, the power receiving resonator, and the auxiliary resonator of the wireless power transfer device according to Embodiment 1.
Figure 6:
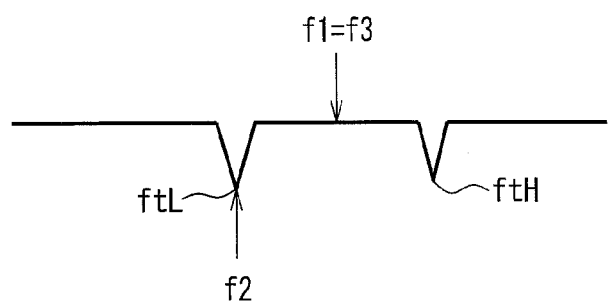
FIG. 6 shows the relationship of the resonance frequencies ftL and ftH of the power transmission-side resonant system with respect to another setting example of the relationship between the resonance frequencies f1, f2, and f3.

FIGS. 5 and 6 show the relationship of the resonant frequency ft of the power transmission-side resonant system with setting examples of the relationship between the resonance frequencies f1, f2, and f3.

FIG. 5 shows a case where the relationship is set such that f1=f2. In this case, as shown in (a), it is possible to make ftH to coincide with f2 or cause ftH to be sufficiently close to f2 by appropriately setting f3 within the range of f1>f3. To cause ftH to be sufficiently close to f2 means bringing the resonant frequency ft into a state in which ft is close to f2 to the extent that an obtained power transfer efficiency is practically equal to that obtained when the resonant frequency ft coincides with the resonant frequency f2 as shown in FIG. 4B. In the following description, the resonant frequency ft that coincides with the resonant frequency f2 includes a resonant frequency ft that is sufficiently close to the resonant frequency f2. FIG. 5 (b) shows a case where ft does not coincide with f2 since the relationship is set such that f1=f2=f3 as described above. By appropriately setting f3 within the range of f1<f3 as shown in (c), it is possible to make ftL to coincide with f2 (the example described above).

FIG. 6 shows a case where the relationship is set such that f1=f3. Here, in the range of f1=f3>f2, it is possible to make ftL to coincide with f2 by appropriately setting the distance between the resonance coil 4a for transmitting power and the auxiliary coil 11. Alternatively, although not shown, also in the range of f1=f3<f2, it is possible to make ftH to coincide with f2 by appropriately setting the distance between the resonance coil 4a for transmitting power and the auxiliary coil 11.

As described above, if the resonant frequency f3 of the power-transmission auxiliary device 9 is different from the resonant frequency f2 of the power receiver 2 (f3≠f2), it is possible to achieve an appropriate effect of making the resonant frequency ft of the power transmission-side resonant system to coincide with the resonant frequency f2. Note, however, that it is preferable that the relationship f3>f2 is satisfied.

Figure 7A:
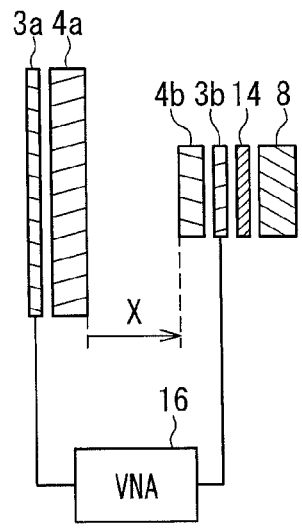
FIG. 7A is a cross-sectional view schematically showing an arrangement of the elements for measuring the change in a distance dependency of the power transfer efficiency on the distance between the power transmission coil and the power receiving coil according to the difference in the posture of the power receiver.
Figure 7B:
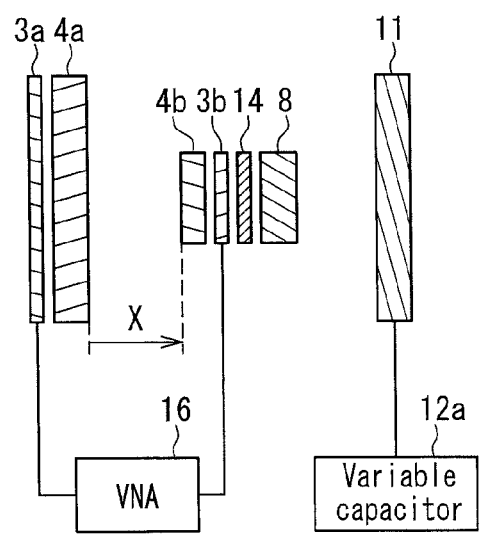
FIG. 7B is a cross-sectional view schematically showing an arrangement in which an auxiliary coil is added to the arrangement shown in FIG. 7A.
Figure 8A:
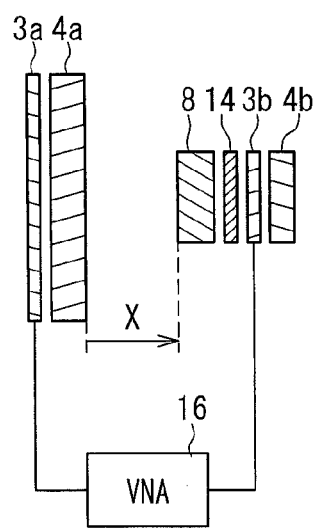
FIG. 8A is a cross-sectional view schematically showing an arrangement of the elements for measuring a distance dependency of the power transfer efficiency on the distance between the power transmission coil and the power receiving coil in a posture of the power receiver different from that shown in FIG. 7A.
Figure 8B:
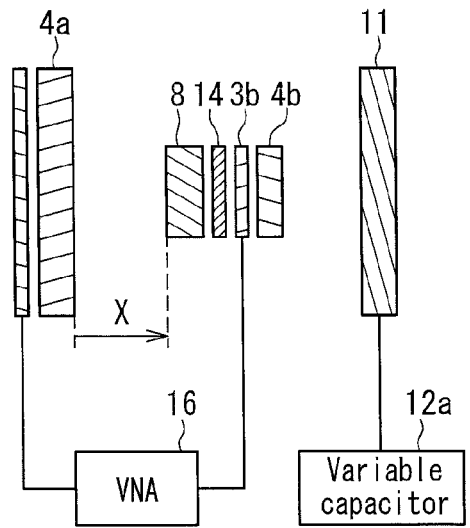
FIG. 8B is a cross-sectional view schematically showing an arrangement in which the auxiliary coil is added to the arrangement shown in FIG. 8A.

Next, a description will be given of results of examining the effect of this embodiment when, for example, a portable power receiver that is an example of the power receiver 2 is disposed upside down with respect to the power transmitter 1. In order to examine the characteristics when the portable power receiver has been disposed upside down, the VNA measurement was carried out for cases where the power receiving coil 4b was disposed closer to the power transmission coil 4a as shown in FIGS. 7A and 7B, and cases where the rechargeable battery 8 was disposed closer to the power transmission coil 4a as shown in FIGS. 8A and 8B. For the purpose of comparison, the measurement was carried out for the same configurations as those of conventional technology in which the auxiliary coil 11 is not provided (FIGS. 7A, 8A) and the configurations according to this embodiment in which the auxiliary coil 11 is provided (FIGS. 7B, 8B).

In the VNA measurement, the distance between the power transmission coil 4a and the auxiliary coil 11 disposed so as to face each other was fixed at 30 mm in the central axis, the power receiver 2 was disposed between the two coils, and the power transfer efficiency between the coils was examined while changing the distance X between the power transmission coil 4a and the power receiving coil 4b. The diameters of the power transmission coil 4a and the auxiliary coil 11 were about 70 mm, and the diameter of the power receiving coil 4b was about 20 mm (the diameters of the two coils 4a and 11 are the same in the following other experiments). The adjusting variable capacitor 12a attached to the auxiliary coil 11 was adjusted such that the resonant frequency ftL of the power transmission-side resonant system during power transfer and the resonant frequency f2 of the power receiving-side resonant system were 12.1 MHz.

Figure 7C:
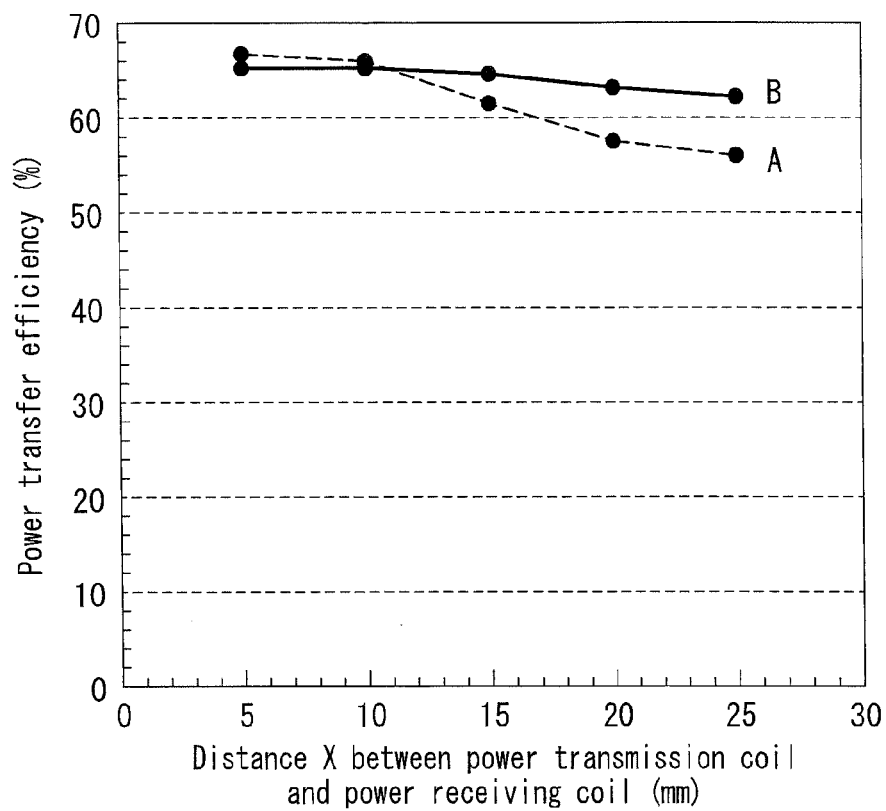
FIG. 7C is a graph showing a distance dependency of the power transfer efficiency on the distance between the power transmission coil and the power receiving coil in the arrangements shown in FIGS. 7A and 7B.

FIG. 7C shows a distance dependency of power transfer efficiency on the distance between the power transmission coil 4a and the power receiving coil 4b in the central axis when the power receiving coil 4b is disposed on the power transmission coil 4a side. In the case of a curve (A), which is the conventional arrangement in which the auxiliary coil 11 is not provided, the farther the power receiving coil 4b located from the power transmission coil 4a, the lower the power transfer efficiency. When the distance (X) between the resonance coils at the center is X=25 mm, the transmission efficiency is lower by about 10% than when X=5 mm. In contrast, in the case of a curve (B), which is the configuration of this embodiment in which the auxiliary coil 11 is provided, the reduction in the transmission efficiency is only 2 to 3% even when X=25 mm.

Figure 8C:
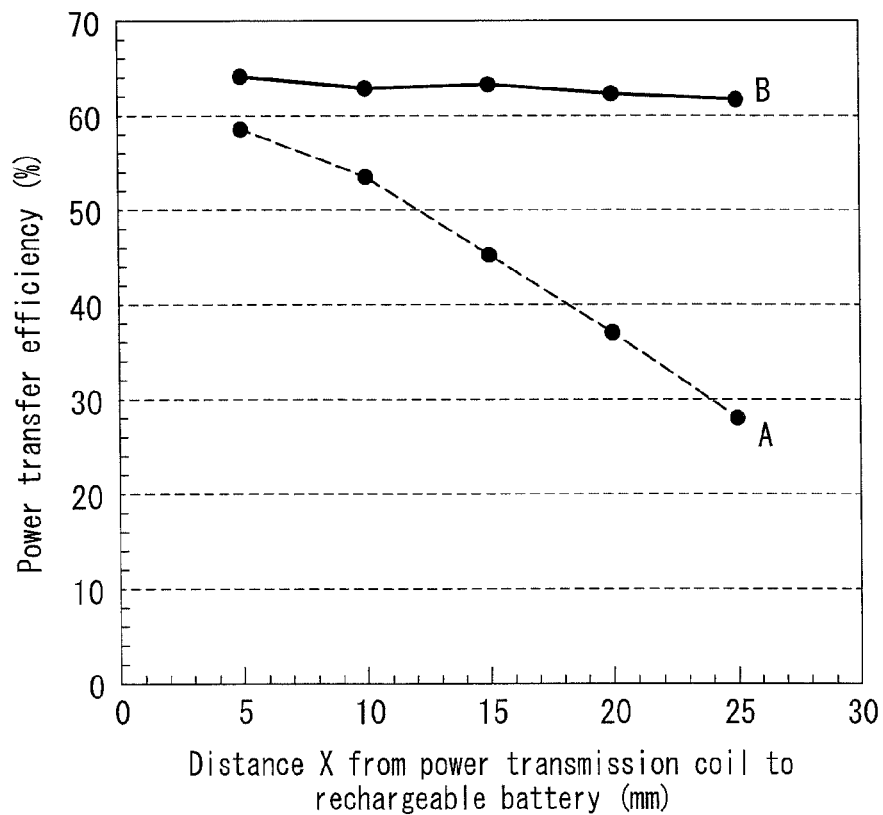
FIG. 8C is a graph showing a distance dependency of the power transfer efficiency on a distance X between the power transmission coil and the power receiving coil in the arrangements shown in FIGS. 8A and 8B.

FIG. 8C shows a distance dependency of the power transfer efficiency on the distance X between the power transmission coil 4a and the rechargeable battery 8 in the central axis when the rechargeable battery 8 is disposed on the power transmission coil 4a side. In the case of a curve (A), which is the conventional arrangement in which the auxiliary coil 11 is not provided, the power transfer efficiency is as low as about several percent due to the influence of the rechargeable battery 8 even when the distance X is small, i.e., X=5 mm. When the rechargeable battery 8 is located further away from the power transmission coil 4a, the power transfer efficiency is significantly reduced, and the value of the power transfer efficiency when X=25 mm is about 30% lower than the value when X=5 mm. In contrast, in the case of a curve (B), which is the configuration of this embodiment in which the auxiliary coil 11 is provided, the reduction in transmission efficiency is only up to 5% when X=25 mm. The reason for this seems to be that, since the power receiving coil 4b has a diameter smaller than the diameters of the power transmission coil 4a and the auxiliary coil 11, a magnetic flux can easily flow between the power transmission coil 4a and the auxiliary coil 11 that are disposed so as to face each other, as a result of which characteristics such as the power transfer efficiency and the possible power transfer distance have improved, compared to the conventional arrangement.

Here, a point that should be noted about the results shown in FIGS. 7C and 8C is that a substantially flat distance dependency is obtained by providing the auxiliary coil 11 and matching the resonant frequencies, regardless of the arrangement of the surface suitable for power reception of the power receiver 2 with respect to the power transmission coil 4a. That is, either in the case when the power receiving coil 4b is disposed on the power transmission coil 4a side as shown in (B) in FIG. 7C or the case where the rechargeable battery 8 of the power receiver 2 is disposed on the power transmission coil 4a side as shown in (B) in FIG. 8C, a substantially flat distance dependency is obtained as long as the power receiver 2 is provided in the space between the power transmission coil 4a and the auxiliary coil 11 that are disposed so as to face each other.

Accordingly, even in the case where the portable power receiver is placed upside down, power transfer can be performed reliably with the portable power receiver postured as it is (capable of single-sided transfer) without the need for the operation of reversing the sides, which has been a problem with the conventional technology. Furthermore, by disposing the power-transmission auxiliary device 9 behind the power receiver 2 and matching the resonant frequency ft of the power transmission-side resonant system for power transfer with the resonant frequency f2 of the power receiving resonator, it is possible to significantly increase the possible power transfer distance as compared to the conventional configurations in which the power-transmission auxiliary device 9 is not provided.

Additionally, in the case of a conventional wireless power transfer device that uses the magnetic field resonance, when the resonant frequency of the power transmission resonator is set to, for example, 12.1 MHz, it has been also necessary to set the resonant frequency of the power receiving resonator to 12.1 MHz. However, if the power receiver 2 is small, the size of the power receiving coil 4b decreases (L decreases). Therefore, it is difficult for the power receiver 2 to match its resonant frequency with the resonant frequency for power transfer. In this respect, according to this embodiment, it is possible to match the resonant frequency of the power transmission-side resonant system with that of the power receiving resonator by the adjusting capacitor of the power-transmission auxiliary device 9. Therefore, this embodiment eliminates the need for providing the power receiver 2 with means for matching the resonant frequency of the power receiving resonator with the resonant frequency of the power transmission resonator, and is particularly effective when the power receiver 2 is small.

Figure 9A:
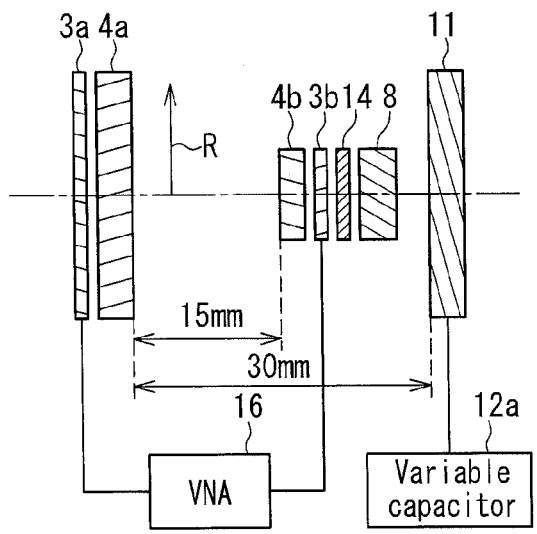
FIG. 9A is a cross-sectional view schematically showing an arrangement of the elements for measuring a distance dependency of the power transfer efficiency between the power transmission coil and the power receiving coil on the distance of radial displacement between the power transmission coil and the power receiving coil.

Next, with reference to FIGS. 9A and 9B, a description will be given of results of measuring the change in the power transfer efficiency when the central axis of the power transmission coil 4a and the central axis of the power receiving coil 4b are radially displaced relative to each other. FIG. 9A shows the arrangement of the coils used for the experiment. The arrangement in the axial direction is the same as that shown in FIG. 7B, and the power receiving coil 4b is disposed on the side closer to the power transmission coil 4a.

The distance between the power transmission coil 4a and the auxiliary coil 11 in the central axis was fixed at 30 mm, and the distance between the power transmission coil 4a and the power receiving coil 4b were fixed at 15 mm. The power transfer efficiency between the power transmission coil 4a and the power receiving coil 4b was measured using the VNA 16 while changing the radial distance R between the central axes of the power transmission coil 4a and the power receiving coil 4b.

Figure 9B:
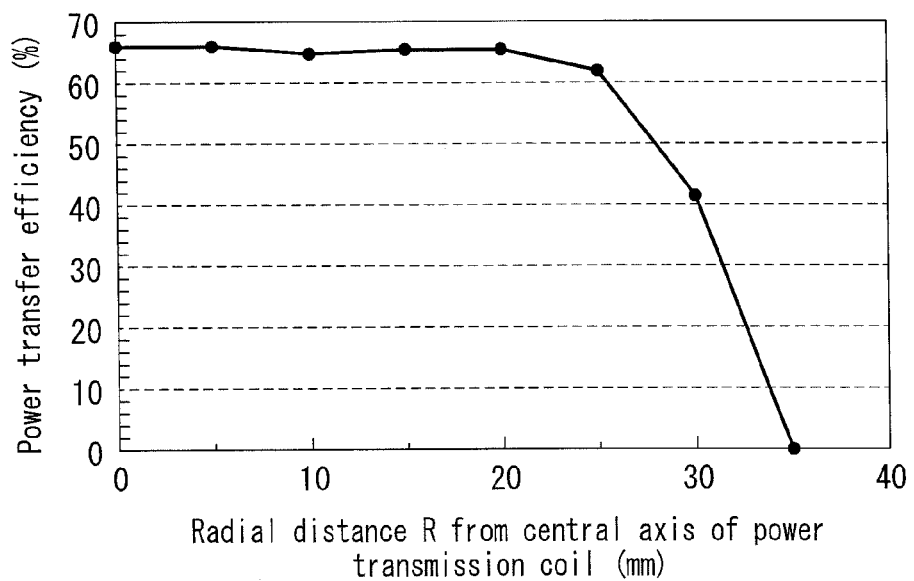
FIG. 9B is a graph showing a distance dependency of the power transfer efficiency on a radial distance R between the power transmission coil and the power receiving coil in the arrangement shown in FIG. 9A.

FIG. 9B shows a distance dependency of the power transfer efficiency between the power transmission coil 4a and the power receiving coil 4b on the radial distance R between the central axes of the power transmission coil 4a and the power receiving coil 4b. It can be seen from the results of the experiment that the power transfer efficiency is constant and high when the radial distance R is 20 mm or less.

Figure 10A:
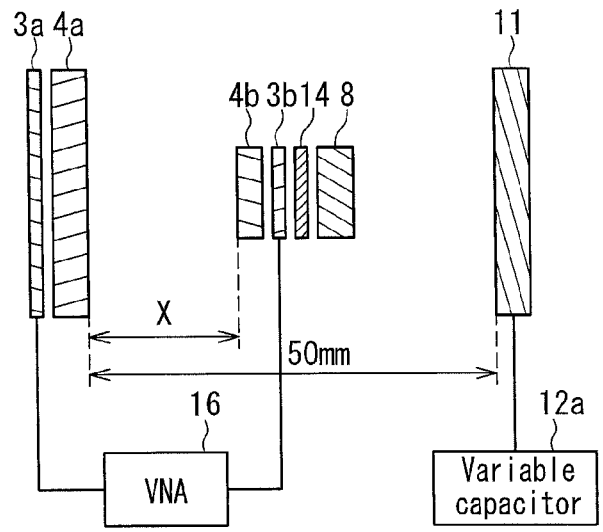
FIG. 10A is a cross-sectional view schematically showing an arrangement of the elements for measuring the change in the frequency dependency of the power transfer efficiency on the resonant frequency f3 according to the distance between the power transmission coil and the power receiving coil.

Next, with reference to FIGS. 10A and 10B, a description will be given of results of measuring a frequency dependency of the power transfer efficiency between the power transmission coil 4a and the power receiving coil 4b on the resonant frequency f3 of the power-transmission auxiliary device 9 while changing the distance between the power transmission coil 4a and the power receiving coil 4b. FIG. 10A shows the arrangement of the coils used for the experiment. The arrangement is basically the same as that shown in FIG. 9A, while the distance between the power transmission coil 4a and the auxiliary coil 11 was increased to 50 mm, and a frequency dependency of the power transfer efficiency on the resonant frequency f3 was measured while changing the distance X from the power transmission coil 4a to the power receiving coil 4b.

Figure 10B:
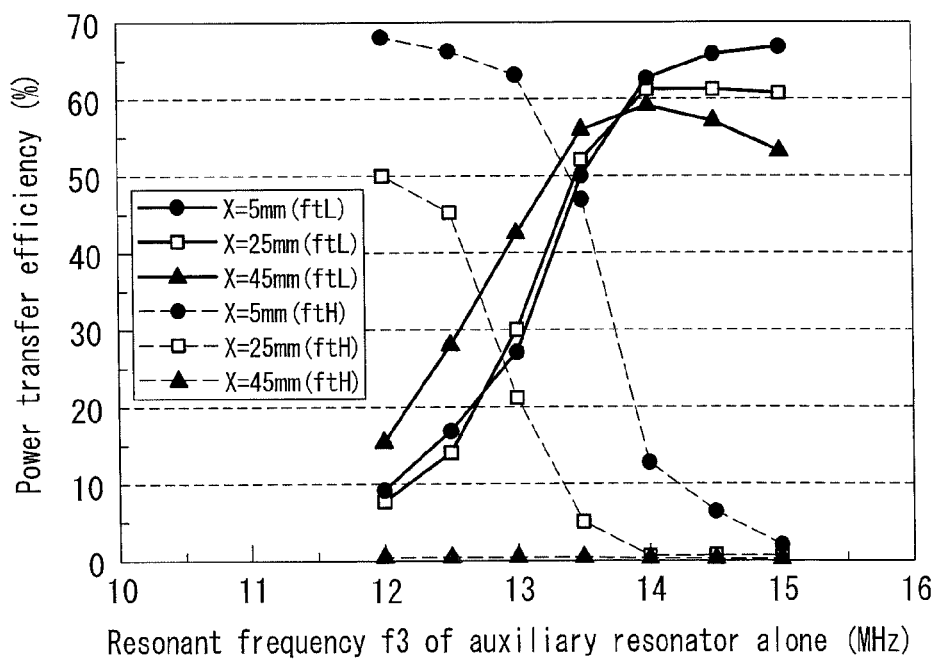
FIG. 10B is a graph showing the change in the frequency dependency of the power transfer efficiency on the resonant frequency f3 according to the distance X between the power transmission coil and the power receiving coil in the arrangement shown in FIG. 10A.

The results of the experiment are shown in FIG. 10B. It can be seen from the results that the change in the frequency dependency of the power transfer efficiency on the resonant frequency f3 with the change in the distance X is significantly different between the lower resonant frequency ftL and the higher resonant frequency ftH. Particularly, it can be seen that the results at the resonant frequency ftL exhibits less variation in the power transfer efficiency with the change in the distance X and is practically preferable compared to the results at the resonant frequency ftH.

Figure 11A:
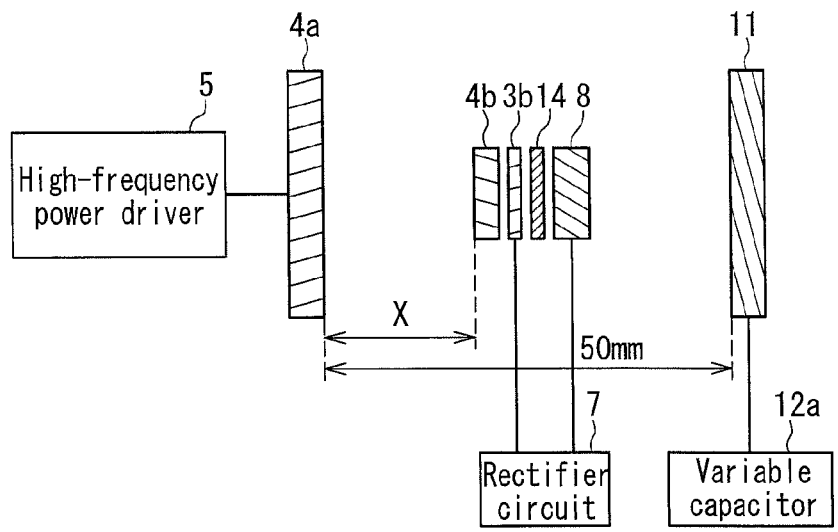
FIG. 11A is a cross-sectional view schematically showing an arrangement of the elements for measuring a frequency dependency of the received power in an actual power receiver on the resonant frequency f3.

Next, with reference to FIGS. 11A and 11B, a description will be given of results of measuring a frequency dependency of the received power in an actual power receiver on the resonant frequency f3. FIG. 11A shows the arrangement of power transfer elements used for the experiment. The arrangement of the coils is the same as that shown in FIG. 10A, while the high-frequency power driver 5 is connected to the power transmission coil 4a and the rectifier circuit 7 is connected to the loop coil 3b. In addition, the distance between the power transmission coil 4a and the auxiliary coil 11 was increased to 50 mm, power transfer was performed while changing the distance X from the power transmission coil 4a to the power receiving coil 4b, and the output power of the rectifier circuit 7 was measured.

Figure 11B:
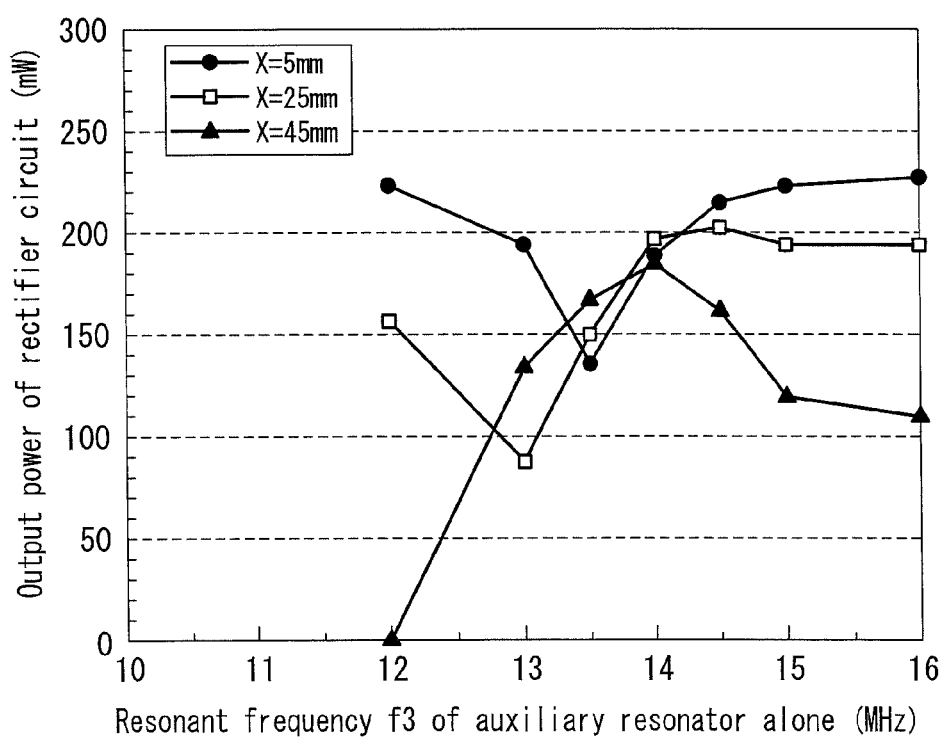
FIG. 11B is a graph showing the change in the frequency dependency of the received power on the resonant frequency f3 according to the distance X between the power transmission coil and the power receiving coil in the arrangement shown in FIG. 11A.

FIG. 11B shows the change in the frequency dependency of the output power of the rectifier circuit 7 on the resonant frequency f3 according to the distance X between the power transmission coil 4a and the power receiving coil 4b. The results of the measurement indicates the similar tendency as that indicated by the results of the power transfer efficiency measurement using the VNA 16 shown in FIG. 10B. The characteristic lines shown in FIG. 11B correspond to the points of the highest power transfer efficiency in the characteristic lines of the dependency on the resonant frequency f3 at the respective distances X shown in FIG. 10B. It can be seen from FIG. 11B that, at all of the distances X, there is resonant frequency f3 (=14 MHz) with which the received powers are comparable and a high.

A high received power always can be obtained by setting the resonant frequency f3 to such specific value as 14 MHz, regardless of the change in the distance X. Note, however, that in this case as well, the resonant frequency f0 of the high-frequency power driver 5 is of importance. That is, in the case of the setting shown in FIG. 5, it is preferable that f0=f1=f2≠f3, and it is more preferable that f0=f1=f2<f3. In the case of the setting shown in FIG. 6, it is preferable that f0=f2=ft≠f1=f3, and it is more preferable that f0=f2=ftL<f1=f3.

Figure 12A:
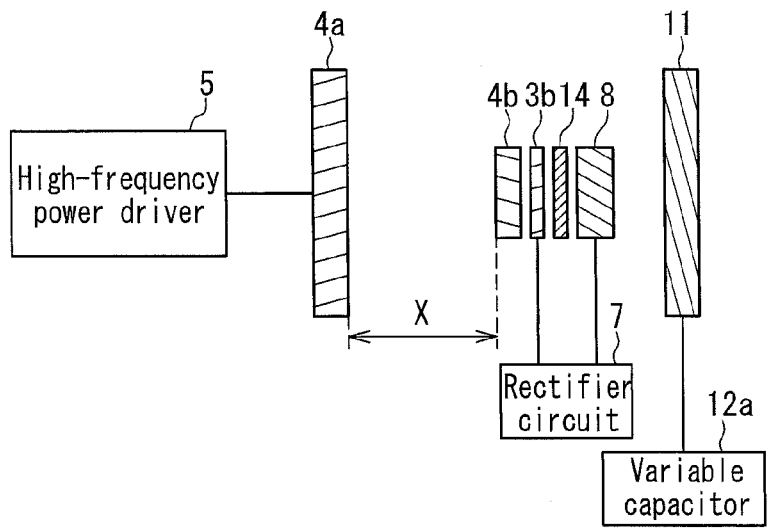
FIG. 12A is a cross-sectional view schematically showing an arrangement of the elements for measuring a distance dependency of received power on the distance between the power transmission coil and the power receiving coil.
Figure 12B:
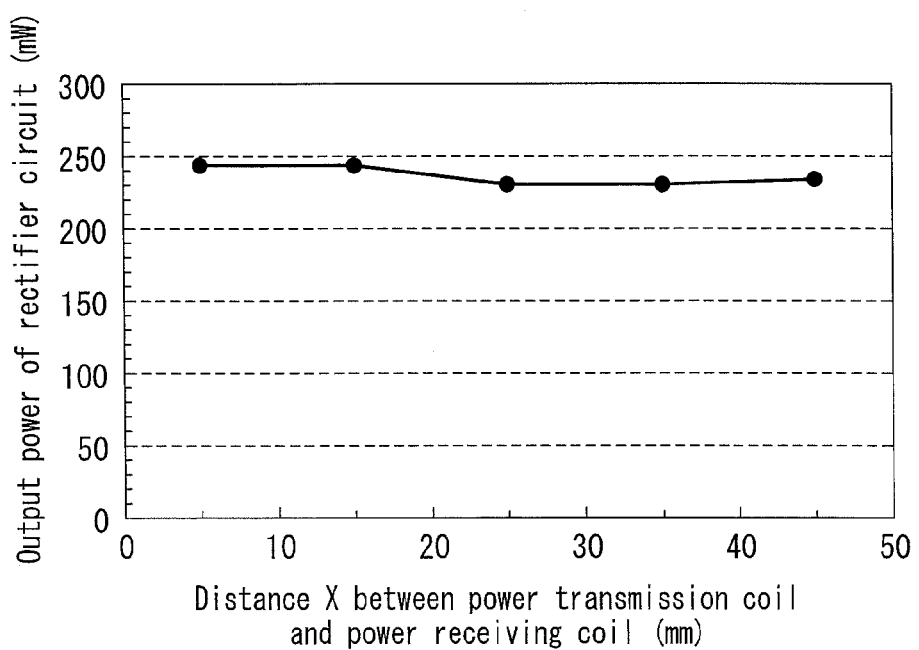
FIG. 12B is a graph showing a distance dependency of the received power on the distance between the power transmission coil and the power receiving coil when the resonant frequency f3=14 MHz in the arrangement shown in FIG. 12A.

Next, a description will be given of results of measuring a distance dependency of the received power on the distance X between the power transmission coil 4a and the power receiving coil 4b when the resonant frequency f3 was maintained constant at 14 MHz (f3=14 MHz) for the power transfer performed in the arrangement shown in FIG. 12A, which is similar to the arrangement shown in FIG. 11A. As can be seen from FIG. 12B, which shows the measurement results, in this case, the received power is substantially constant (the variation range was within 10 percent), regardless of the distance X. That is, a constant received power always can be obtained by setting the resonant frequency f3 to a specific frequency (14 MHz) as shown in the experimental results in FIG. 11B even if the distance X has changed.

Figure 13A:
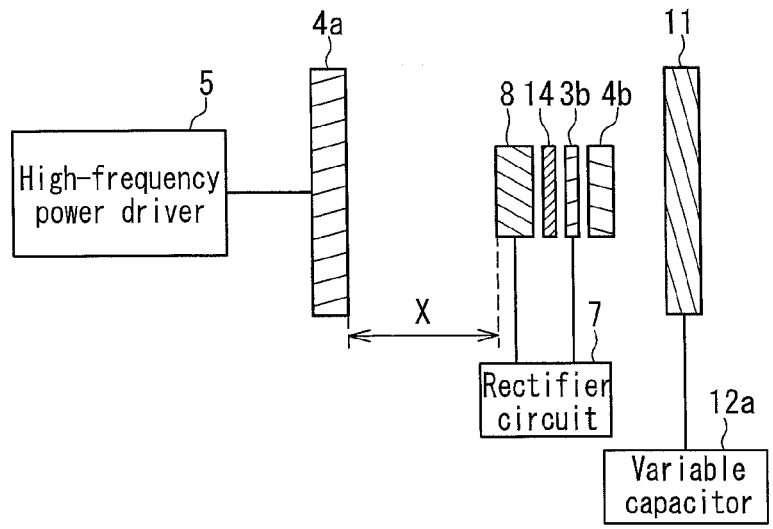
FIG. 13A is a cross-sectional view schematically showing an arrangement of the elements for measuring a distance dependency of the received power on the distance between the power transmission coil and the power receiving coil in a posture of the power receiver that is different from a normal posture.
Figure 13B:
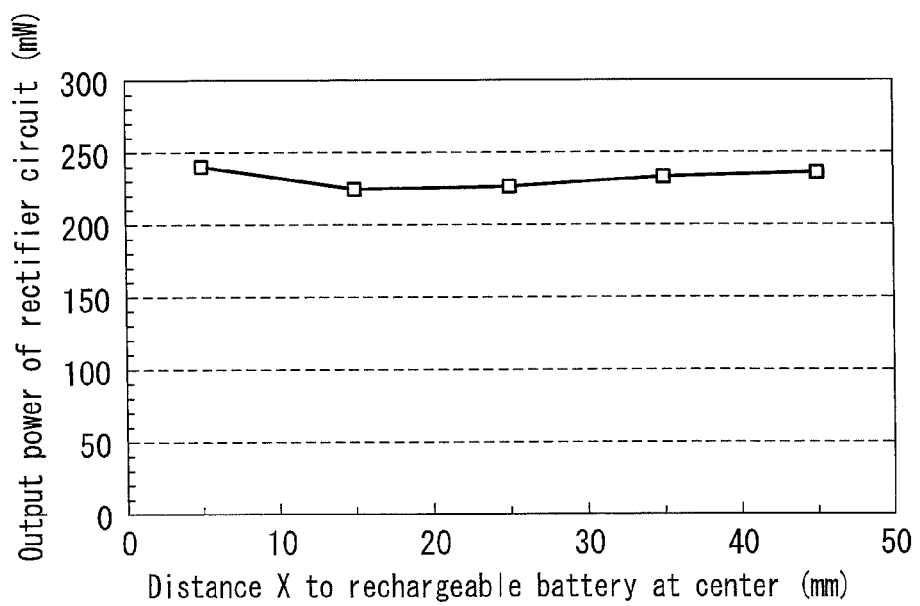
FIG. 13B is a graph showing a distance dependency of the received power on the distance between the power transmission coil and the power receiving coil when the resonant frequency f3=14 MHz in the arrangement shown in FIG. 13A.

Similarly, with reference to FIGS. 13A and 13B, a description will be given of results of measuring a distance dependency of the received power on the distance X when the resonant frequency f3 was maintained constant at 14 MHz (f3=14 MHz), with the posture of the power receiver being different from that shown in FIG. 12A. That is, as shown in FIG. 13A, the rechargeable battery 8 was disposed on the power transmission coil 4a side, and the distance X between the power transmission coil 4a and the rechargeable battery 8 in the central axis was changed. The distance dependency of the received power on the distance X was measured, with the resonant frequency f3 maintained constant at 14 MHz. As can be seen from FIG. 13B, which shows the measurement results, in this case as well, the received power is substantially constant (the variation range was within 10 percent), regardless of the distance X.

Figure 14A:
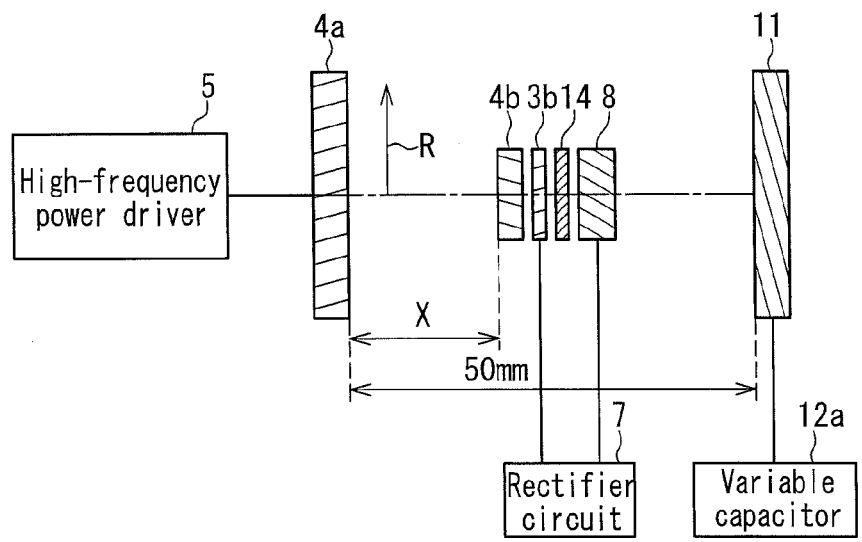
FIG. 14A is a cross-sectional view schematically showing an arrangement of the elements for measuring the influence of the amount of radial displacement between the power transmission coil and the power receiving coil on the received power in an actual power receiver.

Next, with reference to FIGS. 14A and 14B, a description will be given of results of measuring the influence, on the received power in an actual power receiver, of the amount of radial displacement between the central axes of the power transmission coil 4a and the power receiving coil 4b. The arrangement of the elements used for the measurement shown in FIG. 14A is the same as the arrangement shown in FIG. 11A. The measurement was carried out, while changing the radial distance R between the power transmission coil 4a and the power receiving coil 4b and the distance X between the power transmission coil 4a and the power receiving coil 4b.

Figure 14B:
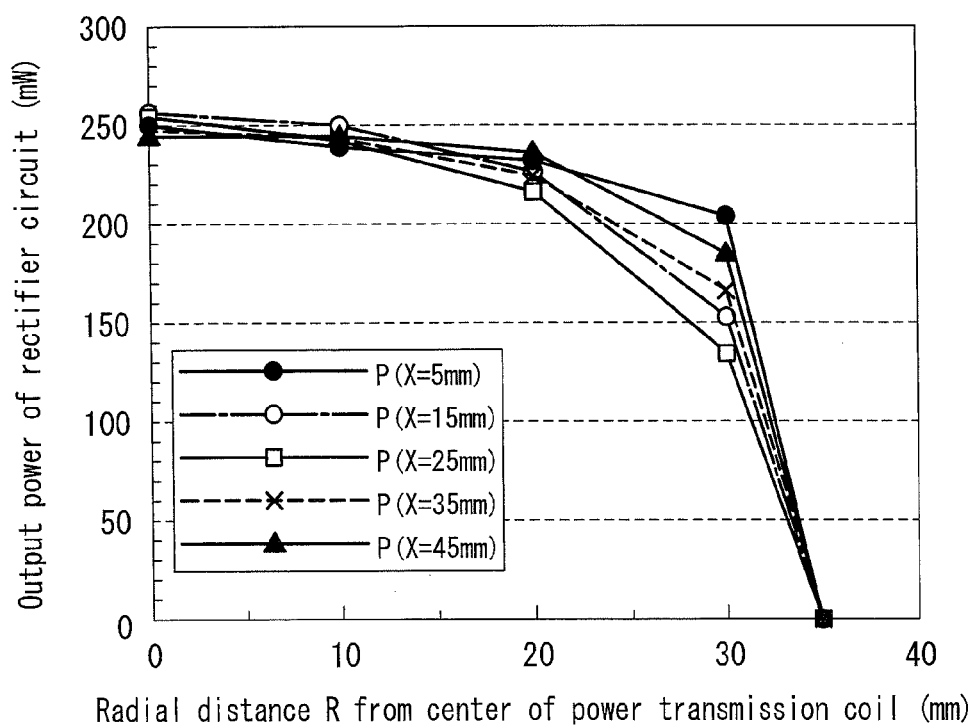
FIG. 14B is a graph showing the change in the distance dependency of the received power on the radial distance R according to the distance X between the power transmission coil 4a and the power receiving coil 4b in the arrangement shown in FIG. 13A.

FIG. 14B shows the change in the distance dependency of the received power on the radial distance R according to the distance X between the power transmission coil 4a and the power receiving coil 4b. As can be seen from FIG. 14B, a uniform received power can be obtained (the variation range was within about 10 percent) in the region where the distance X is 45 mm or less and the radial distance R is 15 mm or less (within the range of a diameter of 30 mm).

Embodiment 2

Figure 15:
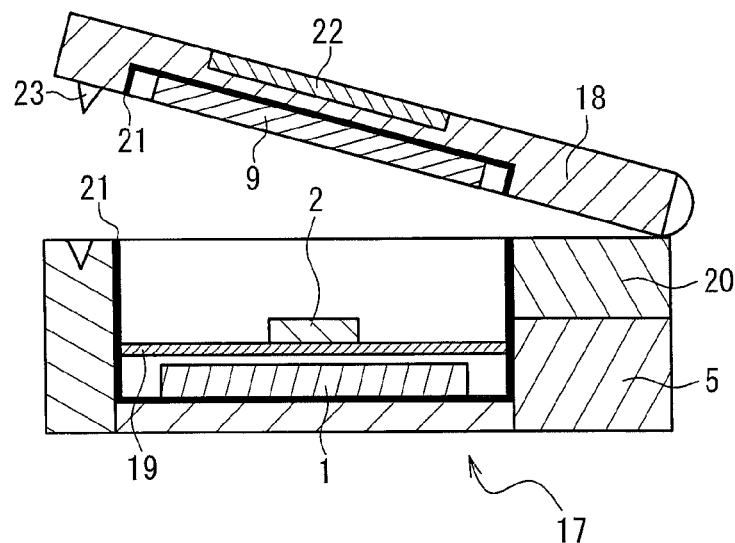
FIG. 15 is a cross-sectional view schematically showing the configuration of a wireless power transfer device according to Embodiment 2.

FIG. 15 is a cross-sectional view showing a wireless power transfer device according to Embodiment 2. This wireless power transfer device includes a vanity case-shaped (also called "music box-shaped") casing 17 and a lid 18 that can be opened and closed, with the power transmitter 1 held in a lower interior portion of the casing 17 and the power-transmission auxiliary device 9 held by the lid 18. Provided above the power transmitter 1 is a support 19 for placing the power receiver 2, and the power receiver 2 (for example, a mobile phone or a hearing aid) can be installed onto the support 19. By closing the lid 18, the power receiver 2 is disposed between the power transmitter 1 and the power-transmission auxiliary device 9. Wireless power transfer is performed in this state.

The casing 17 is provided, for example, with a high-frequency power driver 5 that converts the power received from an AC power supply (AC 100 V) into power capable of being transmitted, and a control circuit 20 for performing impedance matching. Also, an electromagnetic shielding member 21 is disposed so as to surround the region in which the power transmitter 1 and the power-transmission auxiliary device 9 are disposed. In a state in which the lid 18 is closed, the area surrounding the power transmitter 1, the power-transmission auxiliary device 9, and the power receiver 2 is electromagnetically shielded completely, preventing electromagnetic waves from affecting the human body during power transfer and thus providing safety.

In the case of transferring power by magnetic field resonance, a transmission frequency may be set to several MHz to several hundred MHz in practical use. Although the magnetic field resonance power transfer has less influence on the human body than the electric field resonance power transfer, it is necessary to consider the influence on the human body depending on the value of power transmission. Therefore, as in this embodiment, it is desired to electromagnetically shield the entire coils so as to surround the power transmitting and receiving space in order to prevent electromagnetic waves from leaking to the outside during wireless power transfer. More specifically, the vanity case-shaped casing has a configuration in which the resonance coils of the power transmitter 1 and the power receiver 2 and the auxiliary coil of the power-transmission auxiliary device 9 are disposed in an electromagnetically closed space, thus preventing leakage of electromagnetic waves to the outside.

A display device 22 such as a display or an LED may be provided on the surface of the casing 17 as needed, mainly for displaying the charge state and received information, such as emails, of a mobile phone or the like. In addition, the casing 17 is provided with an interlocking projection 23, and the wireless power transfer device is configured such that power transmission does not commence unless the lid 18 is completely closed after the power receiver 2 has been disposed in the power receiving space.

In the case of the resonant-type power transfer, the magnetic field strength is a maximum at the resonant frequency. The control circuit 20 may include, for example, a circuit for attaining high transfer efficiency by controlling the coupling coefficient, the Q value, and the like when the position or the resonant frequency of the power receiver 2 has changed, a circuit for exchanging information with the power receiver 2 and the power-transmission auxiliary device 9, or a circuit for obtaining the positional information of the power receiver 2.

The feature of the wireless power transfer device according to this embodiment is that the resonant frequency of the power transmission-side resonant system for power transfer is matched with that of the power receiving resonator by the setting of the adjusting capacitor provided to the power-transmission auxiliary device 9. The auxiliary coil 11 is disposed at a proper position when the lid 18 is closed, and the adjusting capacitor has been adjusted such that the resonant frequency of the power transmission-side resonant system and that of the power receiving resonator become equal in that state. Therefore, charging can be started immediately after the lid 18 has been closed. Alternatively, it is also possible to adopt a configuration in which the adjusting capacitor is automatically or manually adjusted after the lid 18 has been closed.

Although the vanity case-shaped casing 17 is used in this embodiment, the same effect also can be achieved, for example, using a desk drawer-shaped casing.

Embodiment 3

Figure 16:
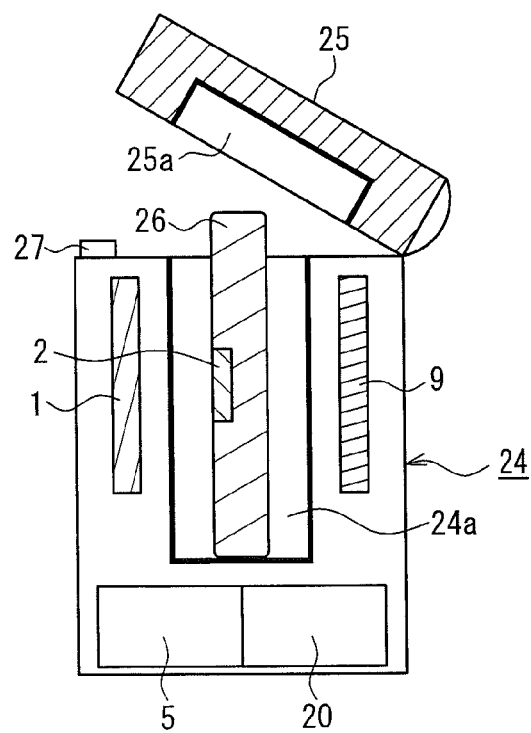
FIG. 16 is a cross-sectional view schematically showing the configuration of a wireless power transfer device according to Embodiment 3.

FIG. 16 is a cross-sectional view showing a wireless power transfer device according to Embodiment 3. The same elements as those of the configuration shown in FIG. 15 are denoted by the same reference numerals, and the description thereof will not be repeated.

This wireless power transfer device is an example in which a casing 24 is configured to be a vertical insertion type. More specifically, a housing portion for insertion of a mobile phone 26, which is an example of a device including the power receiver 2, is formed by a cavity portion 24a of a casing 24 and a recessed portion 25a of a lid 25, and the cavity portion 24a has a configuration that allows the mobile phone 26 to be a vertical insertion type. As in the case of Embodiment 2, the wireless power transfer device is provided with an interlock mechanism 27, and configured such that power transmission does not commence unless the lid 25 is completely closed.

With this configuration, the wireless power transfer device can be made hand-held type so as to facilitate insertion and removal of a power receiver such as the mobile phone 26.

Although a small device such as a mobile phone has been described as an example of the power receiver 2 in the foregoing embodiments, the present invention is also applicable to a large power receiver such as an electric vehicle.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A wireless power transfer device comprising:
   a power transmitter including a power transmission resonator composed of a power transmission coil and a resonant capacitance;
   a power receiver including a power receiving resonator composed of a power receiving coil and a resonant capacitance; and
   a power-transmission auxiliary device including an auxiliary resonator composed of an auxiliary coil and a resonant capacitance,
   thereby transferring power from the power transmitter to the power receiver through magnetic field resonance between the power transmission coil and the power receiving coil,
   wherein the power-transmission auxiliary device and the power transmitter are configured to be disposed so as to face each other, forming a power receiving space for disposing the power receiving coil between the power transmission coil and the auxiliary coil,
   a resonant frequency ft of a power transmission-side resonant system composed of the power transmission resonator and the auxiliary resonator appears as two resonant frequencies of a lower resonant frequency ftL and a higher resonant frequency ftH by a close coupling between the power transmission resonator and the auxiliary resonator, and
   a resonant frequency f3 of the auxiliary resonator is set such that the resonant frequency f2 of the power receiving resonator coincides with either the lower resonant frequency ftL or the higher resonant frequency ftH.

2. The wireless power transfer device according to claim 1, wherein an adjusting variable capacitor is provided as the resonant capacitance of the power-transmission auxiliary device, and a resonant frequency f3 of the auxiliary resonator is set by adjusting the adjusting variable capacitor.

3. The wireless power transfer device according to claim 1, wherein a diameter d1 of the power transmission coil, a diameter d2 of the power receiving coil, and a diameter d3 of the auxiliary coil satisfy the relationship: d1>d2, and d2<d3.

4. The wireless power transfer device according to claim 3, wherein the relationship: d1=d3, and d1>d2 is satisfied.

5. The wireless power transfer device according to claim 3, wherein a central axis of the power transmission coil, a central axis of the auxiliary coil, and a central axis of the power receiving coil are arranged to be coaxial.

6. The wireless power transfer device according to claim 1, wherein a resonant frequency f1 of the power transmission resonator, a resonant frequency f2 of the power receiving resonator, and a resonant frequency f3 of the auxiliary resonator are set so as to satisfy the relationship: f1=f2<f3, or f3<f1=f2.

7. The wireless power transfer device according to claim 1, wherein a resonant frequency f1 of the power transmission resonator, a resonant frequency f2 of the power receiving resonator, and a resonant frequency f3 of the auxiliary resonator are set so as to satisfy the relationship: f2<f1=f3, or f1=f3<C.

8. The wireless power transfer device according to claim 1, further comprising: a casing that holds the power transmitter and the power-transmission auxiliary device and is configured to be capable of setting a positional relationship between the power transmitter and the power-transmission auxiliary device so as to form the power receiving space,
   wherein the power receiver can be removably placed in the power receiving space,
   the casing is provided with a lid that can be opened and closed, and power transfer from the power transmission coil to the power receiving coil is performed with the lid being closed, and
   an area surrounding the power transmission coil, the auxiliary coil, and the power receiving coil is electromagnetically shielded during power transfer from the power transmission coil to the power receiving coil.

9. The wireless power transfer device according to claim 8, wherein the casing is provided with an interlock function for maintaining a state of power transfer from the power transmitter to the power receiver, and
   the interlock function maintains a condition of electromagnetically shielding an area surrounding the power transmission coil, the auxiliary coil, and the power receiving coil during power transfer.

10. The wireless power transfer device according to claim 1, wherein the power transmitter includes a high-frequency power driver that converts power of an AC power supply into high-frequency power capable of being transmitted, and a relationship: ftL=f2=f0 or ftH=f2=f0 is satisfied when the frequency of the power output from the high-frequency power driver is set to be f0.

11. The wireless power transfer device according to claim 1, wherein the resonant frequency f2 of the power receiving resonator and the resonant frequency f3 of the auxiliary resonator satisfy the relationship: f2≠f3.

12. The wireless power transfer device according to claim 1, wherein the wireless power transfer device includes a vanity case-shaped casing with a lid that can be opened and closed, wherein the power transmitter is held in a lower interior portion of the casing and the power-transmission auxiliary device is held by the lid;
   provided that above the power transmitter is a support for placing the power receiver, and the power receiver can be installed onto the support, and by closing the lid, the power receiver is disposed between the power transmitter and the power-transmission auxiliary device; and
   wherein wireless power transfer can be performed in this state.

13. A wireless power transfer method using: a power transmitter including a power transmission resonator composed of a power transmission coil and a resonant capacitance, a power receiver including a power receiving resonator composed of a power receiving coil and a resonant capacitance, and a power-transmission auxiliary device including an auxiliary resonator composed of an auxiliary coil and a resonant capacitance, thereby transferring an electric power from the power transmitter to the power receiver through magnetic field resonance between the power transmission coil and the power receiving coil, the method comprising:

disposing the power-transmission auxiliary device and the power transmitter so as to face each other, forming a power receiving space between the power transmission coil and the auxiliary coil, and performing a power transfer with the power receiving coil being disposed in the power receiving space, by setting a resonant frequency f3 of the auxiliary resonator such that the resonant frequency f2 of the power receiving resonator coincides with either the lower resonant frequency ftL or the higher resonant frequency ftH of a resonant frequency ft of a power transmission-side resonant system composed of the power transmission resonator and the auxiliary resonator, which appears by a close coupling between the power transmission resonator and the auxiliary resonator.

14. The wireless power transfer method according to claim 13, wherein a variable capacitance is used as the resonant capacitance composing the auxiliary resonator, and power transfer efficiency is adjusted by adjusting the variable capacitance while disposing the power receiving coil in the power receiving space.

* * * * *